(12) United States Patent
Nzumafo

(10) Patent No.: US 8,639,225 B2
(45) Date of Patent: Jan. 28, 2014

(54) E-MAIL TO PHONE NUMBER RESOLUTION FOR MOBILE TO MOBILE, MOBILE TO LANDLINE, AND PC TO MOBILE COMMUNICATIONS

(76) Inventor: Heine F. Nzumafo, Hinesville, GA (US)

( * ) Notice: Subject to any disclaimer, the term of this patent is extended or adjusted under 35 U.S.C. 154(b) by 156 days.

(21) Appl. No.: 13/115,831

(22) Filed: May 25, 2011

(65) Prior Publication Data

US 2011/0294481 A1    Dec. 1, 2011

Related U.S. Application Data

(60) Provisional application No. 61/348,083, filed on May 25, 2010.

(51) Int. Cl.
*H04M 3/42* (2006.01)
*H04W 40/00* (2009.01)

(52) U.S. Cl.
USPC ..................... 455/414.1; 455/415; 455/445

(58) Field of Classification Search
USPC ........................ 455/414.1, 445, 415, 414.4; 379/201.01, 201.02, 221.14, 93.24; 709/206

See application file for complete search history.

(56) References Cited

U.S. PATENT DOCUMENTS

| | | | |
|---|---|---|---|
| 6,580,790 B1 * | 6/2003 | Henry et al. | 379/201.01 |
| 6,754,317 B1 * | 6/2004 | Berthoud et al. | 379/93.24 |
| 2003/0092440 A1 * | 5/2003 | Warrier et al. | 455/432 |
| 2005/0117730 A1 * | 6/2005 | Mullis et al. | 379/210.02 |
| 2006/0153162 A1 * | 7/2006 | Croak et al. | 370/352 |
| 2006/0168015 A1 * | 7/2006 | Fowler | 709/206 |
| 2008/0021958 A1 * | 1/2008 | Foote | 709/204 |
| 2008/0192910 A1 * | 8/2008 | Guedalia et al. | 379/142.05 |
| 2010/0246794 A1 * | 9/2010 | Gupta | 379/210.02 |

* cited by examiner

*Primary Examiner* — Lester Kincaid
*Assistant Examiner* — Daniel Lai
(74) *Attorney, Agent, or Firm* — Sinorica, LLC

(57) ABSTRACT

An E-Mail to Phone Number Resolution for Mobile to Mobile, Mobile to Landline, And PC to Mobile Communications comprising of a plurality of profiles associated with a plurality of email addresses and mapped to phone numbers. Callers subscribe to the service platform to initiate a call to a called party. The call is directed to an email address and not a phone number. The email address is resolved to a phone number by the service platform and the call is established between the caller and the called party. The phone number of the caller is masked by the service platform so that the called party is unable to determine the originating phone number.

6 Claims, 7 Drawing Sheets

E-MAIL TO PHONE NUMBER RESOLUTION FOR MOBILE TO MOBILE, MOBILE TO LANDLINE, AND PC TO MOBILE COMMUNICATIONS

The current application claims a priority to the U.S. Provisional Patent application Ser. No. 61/348,083 filed on May 25, 2010.

FIELD OF THE INVENTION

The present invention relates generally to a method and process of associating phone numbers to email addresses for mobile to mobile, mobile to landline, and pc to mobile communications.

BACKGROUND OF THE INVENTION

Presently, mobile networks are connected to the Internet and Plain Old Telephone (POTS) networks (PSTN) through an integrated platform in a uniform environment. Standardized protocols facilitate the transmission of voice and data between the different media. However, all of these models rely on phone numbering and I.P based schemes to identify users and authenticate their calls. This does NOT address the privacy of a user. To address privacy, there are many mechanisms already in use. Callers can block their numbers or choose to not list them. In I.P based schemes, user ID's can be used to identify the caller and the called party and the call is then routed through an IP network. There are approaches that mask numbers so that the recipient of a call cannot determine the source of the call.

Social networking is growing at an alarming rate with Facebook, MySpace, LinkedIn, Twitter, and more. As people communicate more through this medium, it is common for people to communicate with unfamiliar people in their network. The need for privacy persists nonetheless. How do people exchange phone numbers while maintaining a degree of distance? Another increased risk due to technological advances is the frequency with which numbers change. Many people change cell phone numbers even though number portability option is available. People lose their phone as well, and lose their phone numbers. How can we facilitate the process of keeping in touch with people after changing numbers or losing contact?

DETAIL DESCRIPTIONS OF THE INVENTION

All illustrations of the drawings are for the purpose of describing selected versions of the present invention and are not intended to limit the scope of the present invention.

Figure 1:
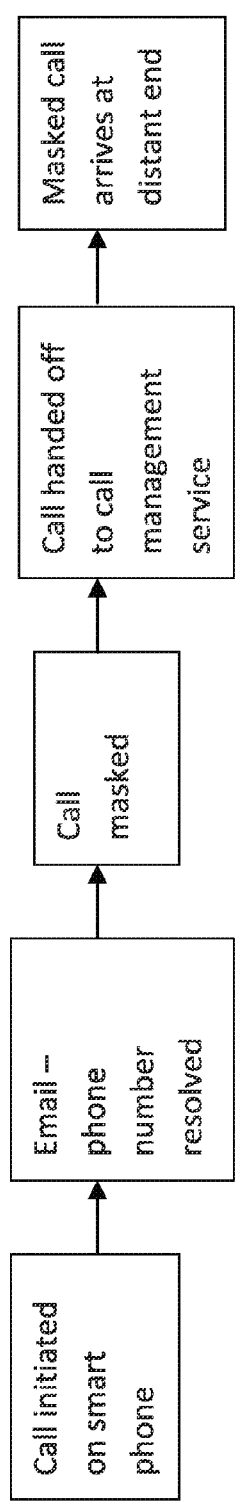
FIG. 1 is a simplified representation flow chart for the e-mail to mobile number resolution model.

In reference to FIG. 1, an email to mobile number resolution model is presented. Resolution takes place at the level of a database which resides on an application server. For each email registered in the database, the email is mapped to a phone number. A phone number may have one or more emails mapped to it. When a phone number is associated to an email address, a masked version of the phone number is used for the calling process so that once the call arrives at the destination, the receiving caller cannot see the caller's number. A summarized process of the present invention involves a caller subscriber initiating a call to a called party subscriber by selecting a called party subscriber's email address. The email address is resolved to a phone number although this phone number is not displayed to the caller subscriber. As the call between the caller subscriber and the called party subscriber is established, the call is masked by hiding the phone number of the caller subscriber from the called party subscriber. After the call is masked, the call connection is handed off to a call management service which establishes the connection with the caller subscriber and the called party subscriber. When the masked call arrives at the called party subscriber, the called party subscriber is able to receive and pick up the call, but is unable to determine the originating phone number of the caller subscriber. Once the email addresses has been validated with a corresponding phone number the masked version of the phone number is used for the rest of the call initiation and session.

It is important to note how this differs from making an IP based call using a screen name. In an IP based model, using a screen name may not keep the IP address of the originating caller unknown to the called party. In other words, IP addressing in VoIP corresponds to phone numbering in mobile and PSTN networks. Thus using a screen name to place VoIP calls is not the same as using an email address because the screen name alone as used for VoIP calls does not hide the details of the IP address whereas using an email for mobile calls as introduced in the present invention keeps the details of the originating caller private.

Figure 2:
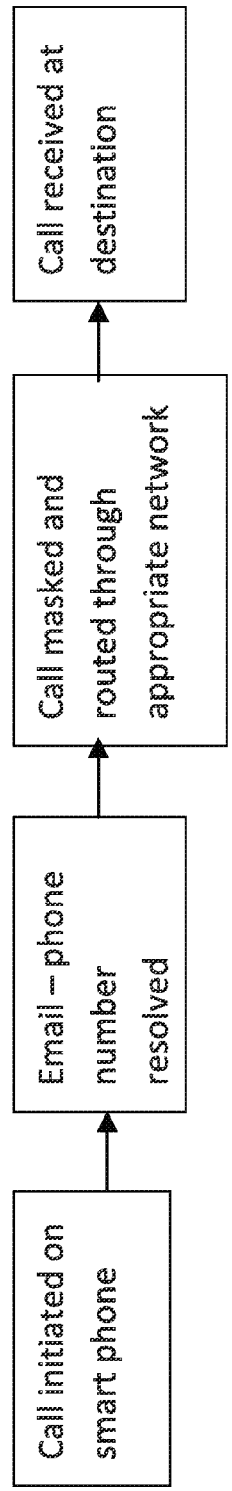
FIG. 2 is a general flow overview of the present invention for all methods of connections.

In reference to FIG. 2, the present invention is run on a standard integrated communications system to include users tied into the World Wide Web, mobile and fixed telephone networks, and a server platform of the present invention. The server platform provides the data, computations, and data transfer necessary for the present invention to operate and is tied to the integrated communications system through an appropriate service provider. This service provider will route information processed by a service platform of the present invention, established as trade name, PrivyMobile. The service platform comprises of a plurality of databases, a service application, an email to phone number resolution model, and a communications gateway. The service provider transfers information back and forth between the service platform and the integrated communications system to allow data to be sent the World Wide Web, mobile and fixed telephone networks, and application servers through a communications cloud depending on the mode of communications (PSTN for calls to landlines, VoIP for PC initiated traffic, etc).

A key aspect of this application is authentication of a call connection. During the call establishment process, the server platform first authenticates the relationship between a caller and a called party before proceeding to setup the call in preparation for connection. The relationship is established by first verifying that both the caller and the called party have each other's email address on their respective contact lists. Both the caller and the called party must have each other's email address for the setup to complete, otherwise a message is sent back to the caller notifying them of the situation and requesting an invite to be sent to the called party. If an invite is sent to the called party, the called party will receive notification of a pending invite. The called party can then determine whether to add the caller to the called party's list of contacts.

Another example of the present invention is exemplified through a mobile to mobile phone call. The mobile to mobile phone call involves a mobile application which resides on the mobile phone or any suitable smart phone device. Each mobile subscriber will have a profile which includes at least one email address and a phone number. This profile is updated either online through a website or directly on and by the handheld device. In order for a mobile subscriber to place a call, that mobile subscriber must have the mobile application installed on their smart phone. At the same time, for a mobile subscriber to receive a call, that mobile subscriber must have a profile established online. Both the mobile subscriber placing the call and the mobile subscriber receiving the call must have each other's email address in their contact list for the call to be allowed and connected. If one mobile subscriber deletes the other mobile subscriber, the call will not be allowed and connected and the mobile subscriber placing the call will be prompted with an audio message stating that "The party you call does not identify you". Mobile subscribers are able to update their profile information and other settings on their handheld device or through an online website. When one mobile subscriber dials another mobile subscriber in their contacts list, the email to phone number resolution system resolves the email address of the mobile subscriber being called into the actual phone number of the mobile subscriber that is set in their profile. This resolution process is completed on a systemic level, without providing information to either mobile subscriber. Both parties' are connected to the phone call without ever having access to seeing the other party's phone number. The mobile subscriber receiving the call sees that the phone number of the mobile subscriber placing the call is "unavailable" or other suitable message to indicate that the caller ID of the mobile subscriber placing the call is not available. In addition, the name of the mobile subscriber placing the call, as defined in the contact list of the mobile subscriber receiving the call will be displayed. Mobile subscribers are able to maintain their account which includes settings, contacts, emails, phone numbers, and other personal profile information online and stored in a database server. To access the account, mobile subscribers use a login and passed to access their personal account. Each user account will include but is not limited to the user's name, one phone number, one or more emails mapped to the phone number, and a list of contacts. Phone features such as speed dial, call blocking, and other industry available phone features may be optionally available.

Figure 3:
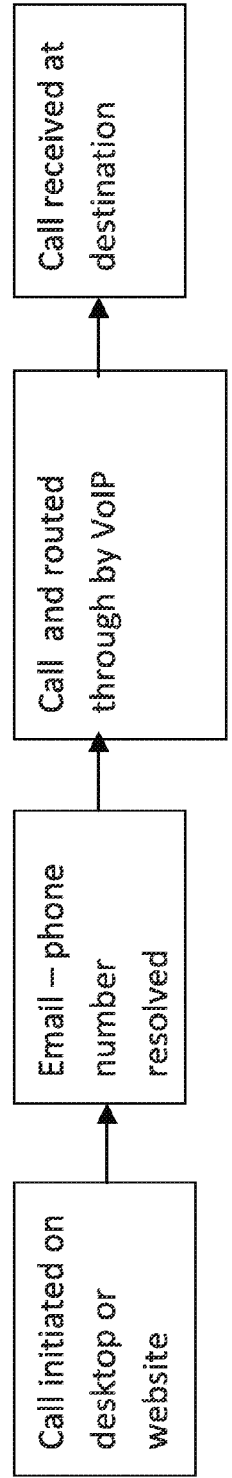
FIG. 3 is a flow chart of data flow for the present invention.

As seen in FIG. 3, a data flow scheme represents the intended process of the application. To start the call process, a caller subscriber places a call to a called party subscriber. If the caller subscriber is not on the contact list of the called party subscriber, the application notifies the caller subscriber that the call cannot be initiated. If the caller subscriber is on the contact list of the called party subscriber, the application proceeds to check the blocked status of the caller subscriber. If the caller subscriber is on the block list of the called party subscriber, the application notifies the caller subscriber that the called party subscriber is not accepting calls at this time.

If the caller subscriber is not on the block list of the called party subscriber, the application proceeds to use the phone number resolution system to resolve the email address of the called party subscriber into a phone number by utilizing the profile of the called party subscriber. If the called party subscriber has no number set or an incomplete number set in the profile of the called party subscriber, the application notifies the caller subscriber that there is no valid number for the person being called. If the called party subscriber has an international number set in the profile of the called party subscriber, the application notifies the caller subscriber that the called party subscriber has an international number which will incur an international charge and continues to query the caller subscriber as to whether or not to continue with the call. If the caller subscriber does not wish to proceed with the international call, the application notifies the caller subscriber that the call attempt is terminated. If the caller subscriber confirms to proceed with the international call, the call connection between the caller subscriber and the called party subscriber is connected. Furthermore, if the called party subscriber has a number that is on record, not incomplete, not an international number, or does not matches any other future implemented conditions, the phone call connection is established between the caller subscriber and the called party subscriber. The caller ID shown to the called party subscriber is displayed as "Unknown" or any other suitable message to inform the called party subscriber that phone number ID is not available. If a contact name is set for the caller subscriber by the called party subscriber and stored in the contact list of the called party subscriber, this contact name is displayed.

Implementation of the present invention is robust, scalable and must be device independent. All brands of cellular smart phones and operating systems are able to develop the application necessary to run the current invention. The invention application will be able to run on but not limited to iPhone, Blackberry, Droid, and other suitable cellular smart phones. It will be run on operating systems including but not limited to iOS, Android, Symbian, Windows Mobile, Google OS.

The application should allow for dialing to and from any country. It must also be in multiple languages. These are choices that should be available during setup and/or download.

Figure 4:
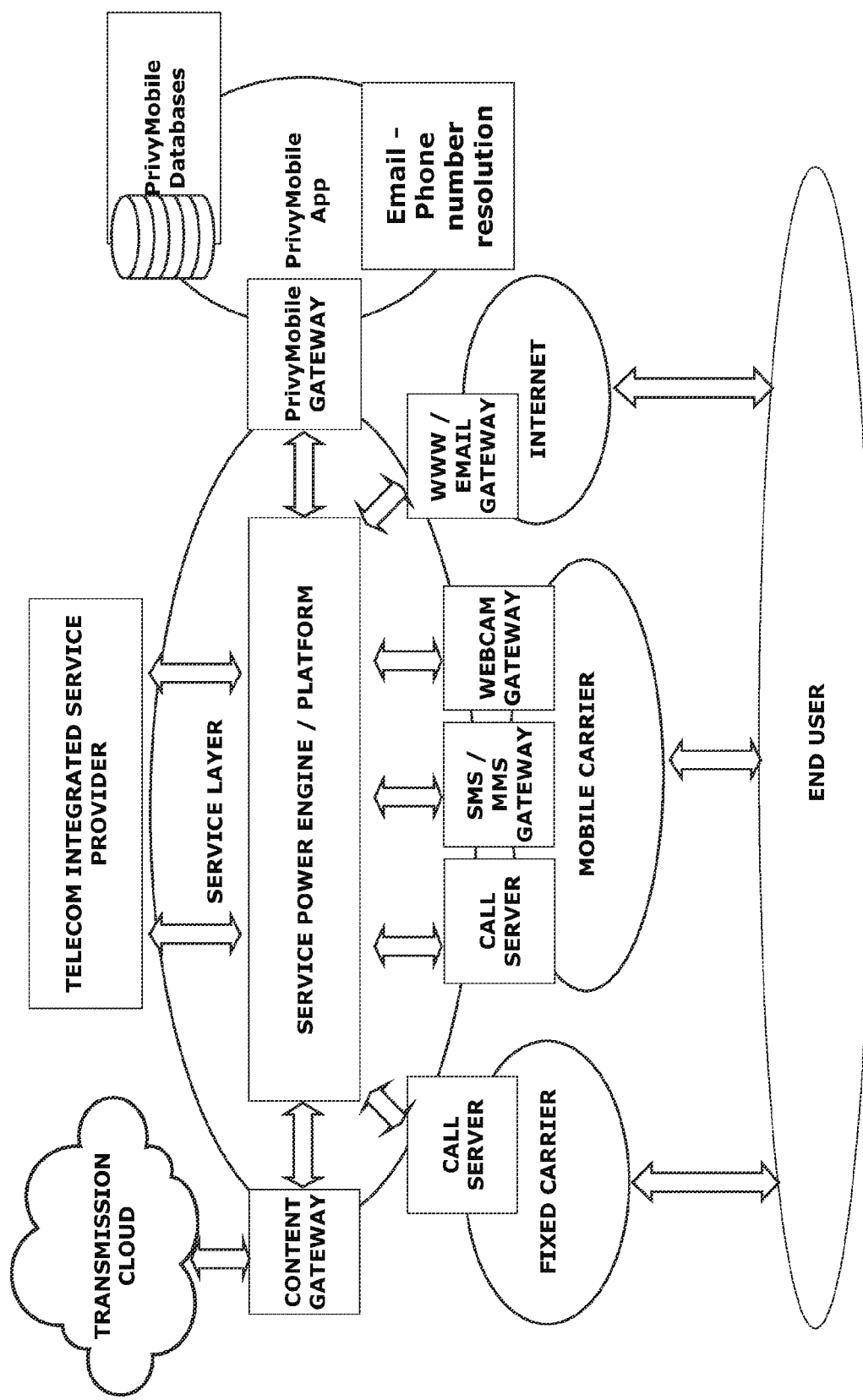
FIG. 4 is a sample diagram of the user interface for the present invention.

The user interface will have, but not limited to the functions as shown in FIG. 4 The user information on the smart phone will sync with user information on the website such that details can be updated either on the handheld or on the website. If the user does not have a smart phone, he or she can only receive calls from members on their contact list but they will not be able to place calls directly. The website will have functionality to manage user accounts such as billing, account information, and contacts. Billing information may be viewed on the handheld but is not required.

In order for a call to be completed, the caller must be logged on to the server application in order to use the application and initiate a call. However, the called party does not need to be logged on to the server application in order to receive a call, making the calling process seamless.

Figure 5:
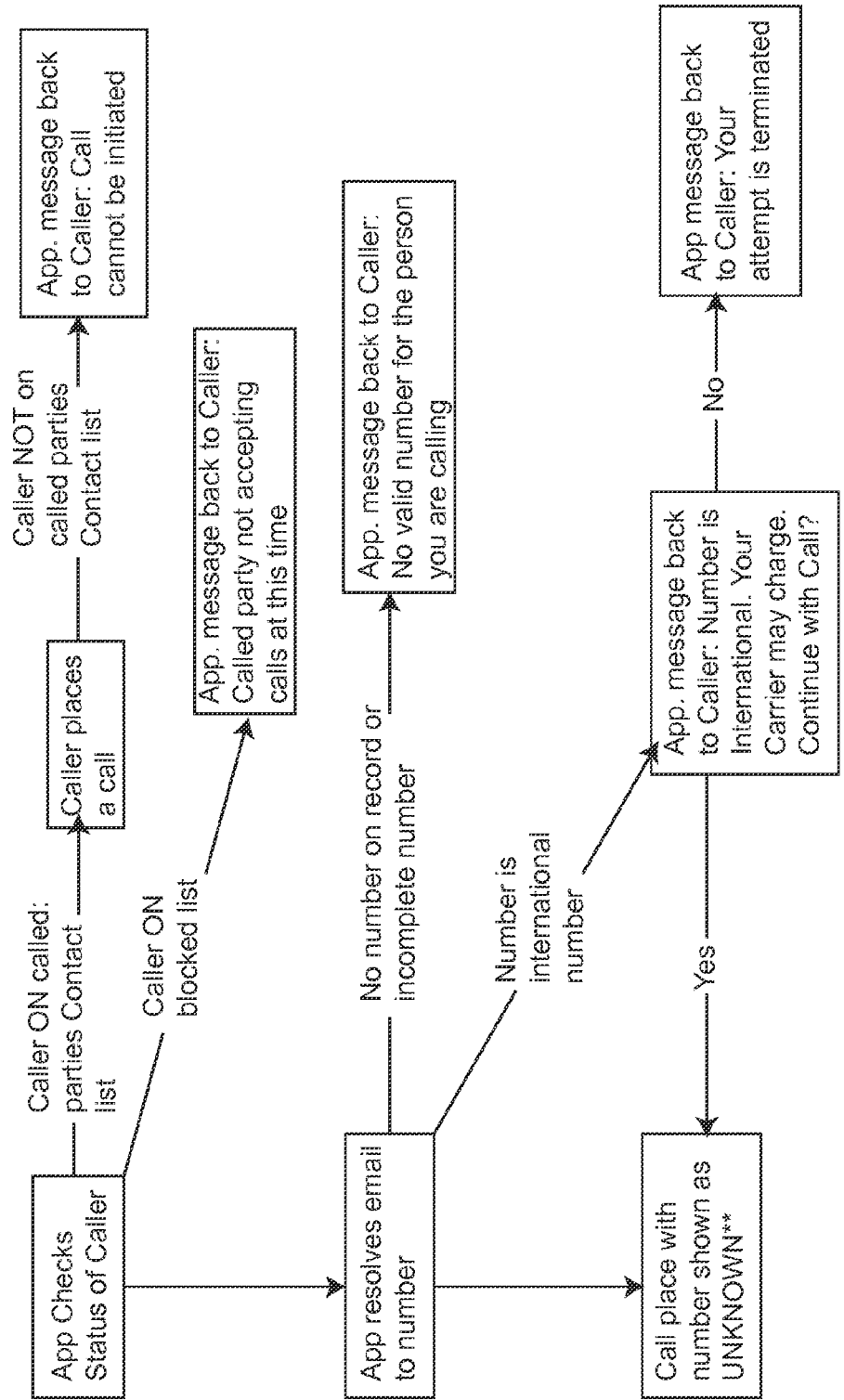
FIG. 5 is a simplified representation flow chart for the for the mobile to mobile resolution model.

A status functionality is used to restrict calls as needed, otherwise, the application will process calls as they arrive. The status functionality allows called parties to not receive a call from the caller if the status of the caller as set in the called party's address book is "blocked". With reference to FIG. 5, a call is initiated on a smart phone from a caller to a called party. The called party's email address as set in the profile of the called party is resolved by the service platform into a phone number. The phone number is masked by the service platform and the call connection is then established between the caller and the called party. When the connection is established, the called party receives an incoming call from the caller while the caller is unable to see the actual originating phone number of the caller. Instead, the phone number of the caller is masked and an alternative message is displayed to the called party.

The service platform supports SMS, MMS, video messaging and other data and multimedia data transmissions. For SMS, MMS and video messaging to work, both the caller and the called party must have the application installed on their smart phones.

In one example of use of the present invention, a mobile phone is used to make a call to a landline. This use allows the caller to make a call from a mobile phone where the call terminates to a landline. When a call originates from a mobile phone, both the caller and the called party's user profiles are identified, phone numbers are resolved, validated, and the call is connected through masking of the caller's number. As long as the user of a landline has a profile through which the email used to initiate the call can be resolved to, and has updated the contact list to include the email of the calling party, the call will be processed. The call will go through the PBX system as in any traditional phone call. However, when a call originates from a landline, there is no direct or simple means of dialing into the service platform system for verifying and validating the caller and the called party's addresses. In alternative versions, the caller can make a call from a landline to a called party and be able to access the service platform to allow email to phone number resolution. A landline caller may first dial a number which is associated with the service platform and then using the numeric number-pad, input the email address of the called party to then be resolved to a phone number by the service platform to complete the call connection.

In yet another example of use of the present invention, a computer is used to make a call to a phone through a computer application. This implementation allows users to place calls from their PC using either a desktop version of the application or directly from the service platform website. From the computer, a user will need to download the desktop version of the application from either the website or another approved source. Using the application, the user starts by logging on to the application using his or her login credentials. The user can access his or her contact list and then place a call, send an SMS, MMS, or other communication means through the service platform. Once the call is initiated, the caller is validated by the service platform and the call is routed over VoIP to the called party. The routing of the call can be done by peer-to-peer or any other means of VoIP. At the called party end, the call connection is established if the receiving party has subscribed to the service and the caller is on the contact list of the called party.

Figure 6:
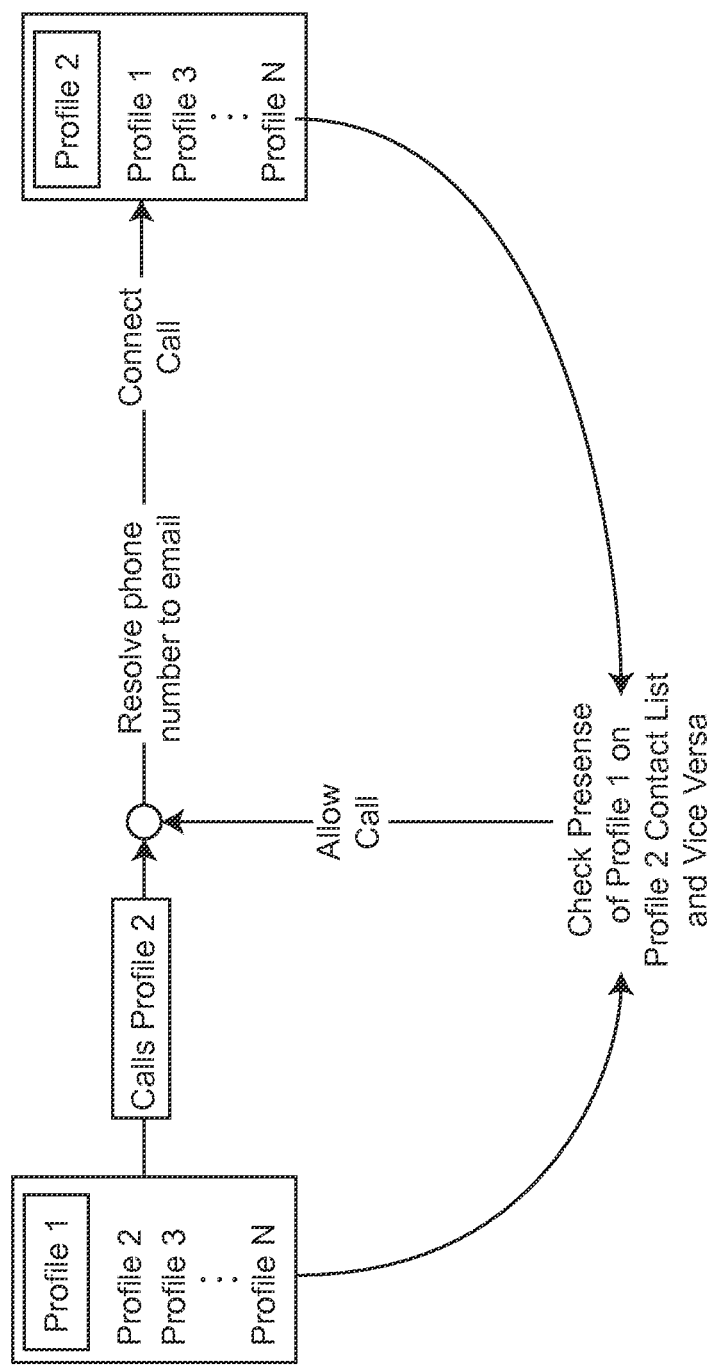
FIG. 6 is a simplified representation flow chart for the PC to mobile resolution model.
Figure 7:
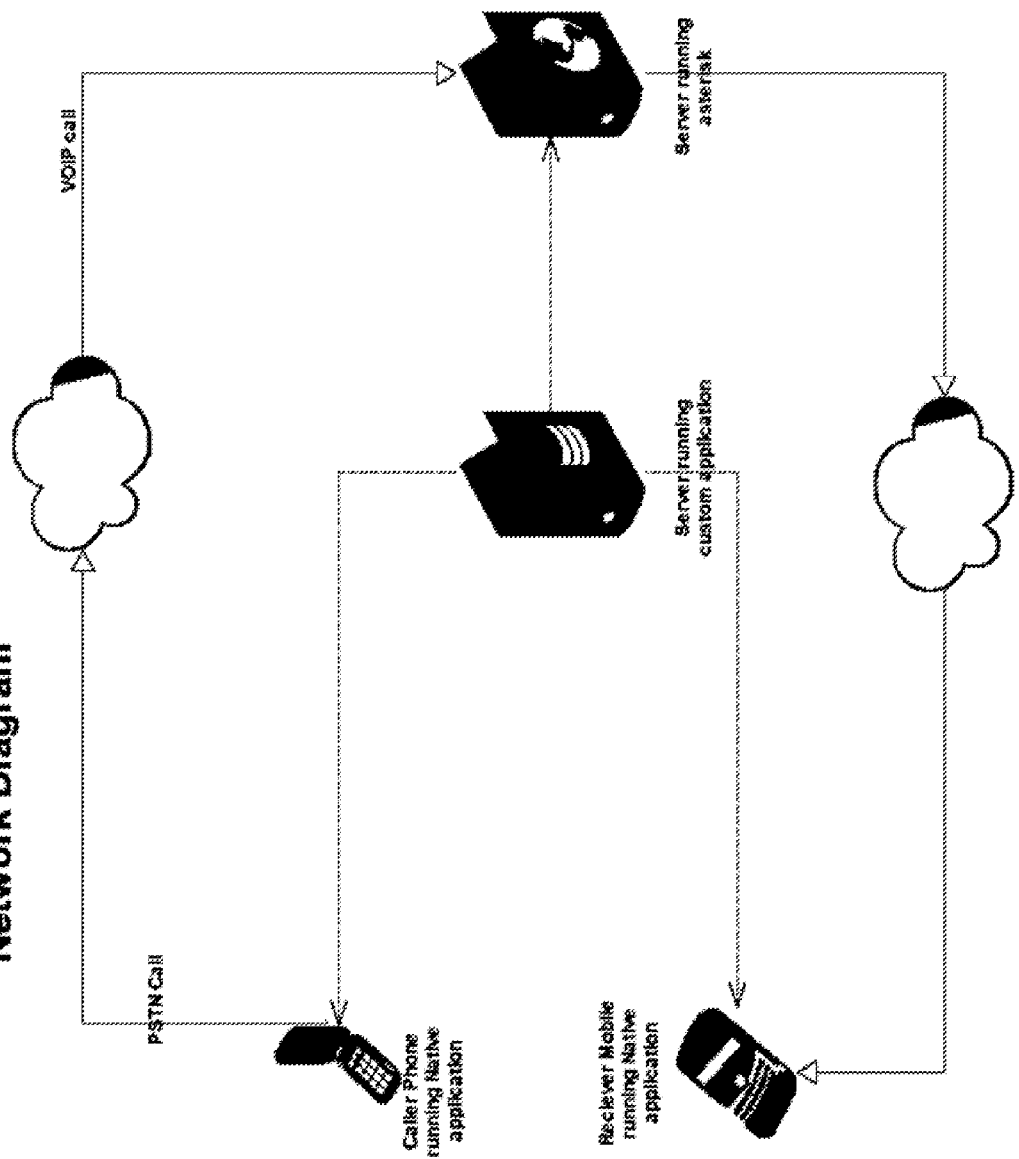
FIG. 7 is a simplified representation of the network diagram for assisted solution.
Figure 8:
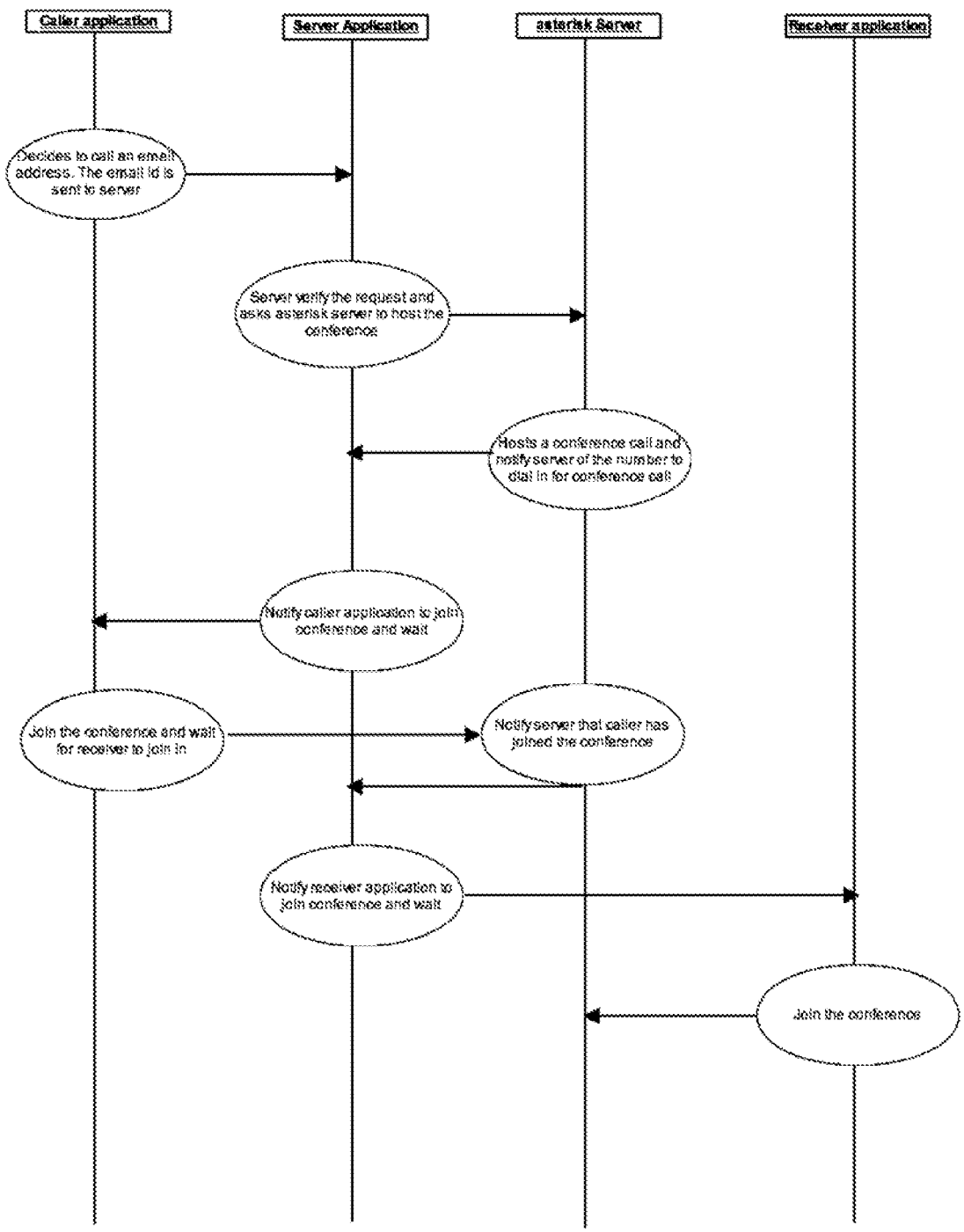
FIG. 8 is a simplified sequence diagram for assisted solution.
Figure 9:
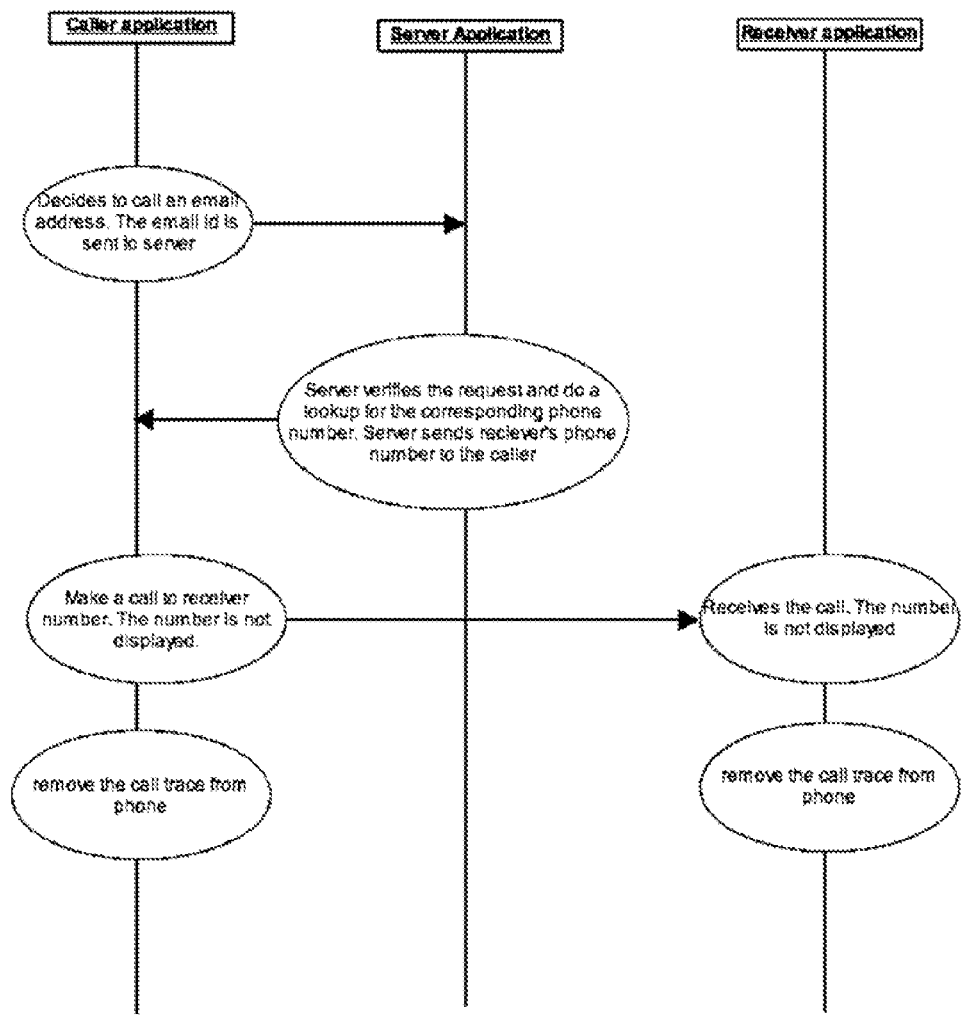
FIG. 9 is a simplified sequence diagram for unassisted solution.

In yet another example of the use of the present invention, a computer is used to make a call to a phone through a website interface. The caller utilizes the PrivyMobile service platform website to initiate a call to the called party. The caller begins by logging into the website of the service platform website by providing their login credentials. Once logged on, the caller can place calls directly from his or her list of contacts. The email to phone number resolution process takes place and the call is established by VoIP. At the called party end, the call from the caller is accepted if the called party has subscribed to the service and the caller is on the contact list of the called party. As exemplified in FIG. 6, a call is initiated by a caller on a computer application or website interface. The called party's email is resolved to a phone number and masked by the service platform. Subsequently, the call is established and routed through VoIP and the called party receives the call.

This approach ensures that the called party will not know the phone number of the caller and vice versa unlike other VoIP approaches whereby the caller must have the screen name or the phone number of the person they wish to call. For SMS, MMS, video message, and other means of communication to work, the receiving entity must have the application on their cellular device and the same rules for email to number resolution apply.

Although the invention has been explained in relation to its preferred embodiment, it is to be understood that many other possible modifications and variations can be made without departing from the spirit and scope of the invention as hereinafter claimed.

What is claimed is:

1. A method of email to phone number resolution for communications by executing computer-executable instructions stored on a non-transitory computer readable medium, the method comprises the steps of:

associating of a plurality of profiles to a plurality of email addresses and a plurality of phone numbers;

storing of a contact list associated with a first profile in a communicating device;

calling of a second profile by a first profile, wherein the first profile is calling the second profile stored on the contact list by means of communicating device;

authenticating the call by the first profile;

permitting of the call through a service platform, wherein the call is authenticated;

masking of the call by means of resolving the plurality of email addresses to the plurality of phone numbers;

determining the presence of an email address associated with the first profile on the contact list of the second profile and the presence of an email address of the second profile on the contact list of the first profile for the authentication process;

providing means to the plurality of profiles to mask the phone number and IP address of the calling location;

determining a status of the email address of the first profile on the second profile's contact list, wherein the status of the email address of the first profile is on a block list of the second profile or is not on the block list of the second profile;

resolving of the email address to a phone number of the second profile; and connecting the call between the first profile and the second profile, wherein the call by the first profile is shown as unknown; and notifying the first profile of invalidity of call, wherein the phone number associated to the second profile is null or incomplete.

2. The method of email to phone number resolution for communications by executing computer-executable instructions stored on a non-transitory computer readable medium of claim 1, notifying the first profile of inability to complete the call, wherein the presence of the email address associated with the first profile is absent on the second profile's contact list.

3. The method of email to phone number resolution for communications by executing computer-executable instructions stored on a non-transitory computer readable medium of claim 1, notifying the first profile that the second profile is not accepting calls at the time, provided that the email address of the first profile is on the block list.

4. The method of email to phone number resolution for communications by executing computer-executable instructions stored on a non-transitory computer readable medium of claim 1,
  notifying the first profile of an international call, wherein the phone number associated to the second profile is an international phone number;
  querying the first profile for connection of call; and
  providing means to confirm connection of international call between the first profile and the second profile.

5. The method of email to phone number resolution for communication by executing computer-executable instructions stored on a non-transitory computer readable medium of claim 1,
  providing means to add new contacts to the contact list, wherein the new contacts are email addresses; and
  the new contacts with email address are profiles registered with the service platform.

6. The method of email to phone number resolution for communications by executing computer-executable instructions stored on a non-transitory computer readable medium of claim 1,
  providing means to login to the service platform to access the contact list for direct connection between a first profile and a second profile, wherein the direct connection is made through a voice over IP connection.

* * * * *